(12) United States Patent
Ledwith et al.

(10) Patent No.: US 12,371,600 B2
(45) Date of Patent: Jul. 29, 2025

(54) SEALANT MATERIAL

(71) Applicant: Henkel AG & Co. KGaA, Duesseldorf (DE)

(72) Inventors: Deirdre Ledwith, Dublin (IE); Laura Vaissaud, Civrieux (FR); Michael Doherty, Kildare (IE); James Houlihan, Dublin (IE); Brendan Kneafsey, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 268 days.

(21) Appl. No.: 18/124,804

(22) Filed: Mar. 22, 2023

(65) Prior Publication Data
US 2023/0220254 A1    Jul. 13, 2023

Related U.S. Application Data

(60) Division of application No. 16/387,081, filed on Apr. 17, 2019, now Pat. No. 11,618,841, which is a continuation of application No. PCT/EP2017/075944, filed on Oct. 11, 2017.

(30) Foreign Application Priority Data

Oct. 24, 2016 (GB) ..................................... 1617938

(51) Int. Cl.
| | |
|---|---|
| *C09J 175/14* | (2006.01) |
| *C09J 5/00* | (2006.01) |
| *C09J 11/08* | (2006.01) |
| *C09K 3/10* | (2006.01) |
| *C10M 101/00* | (2006.01) |
| *F16L 15/04* | (2006.01) |
| *F16L 58/18* | (2006.01) |

(52) U.S. Cl.
CPC ............... *C09J 175/14* (2013.01); *C09J 5/00* (2013.01); *C09J 11/08* (2013.01); *C09K 3/10* (2013.01); *C09K 3/1021* (2013.01); *C09K 3/1028* (2013.01); *C10M 1/00* (2013.01); *F16L 58/182* (2013.01); *C09J 2475/00* (2013.01); *C09K 2003/1065* (2013.01); *C09K 2200/0617* (2013.01); *C09K 2200/065* (2013.01); *C09K 2200/0667* (2013.01); *F16L 15/04* (2013.01)

(58) Field of Classification Search
CPC .......... C09J 175/14; C09J 11/08; C09K 3/10; C09K 3/1021; C09K 3/1028; C09K 2003/1065; C09K 2200/0617; C09K 2200/065; C09K 2200/0667; C09K 3/1006; C09K 2200/0441; C09K 2200/0655; C10M 1/00; F16L 15/04; F16L 58/182
USPC ....................................................... 401/9, 49
See application file for complete search history.

(56) References Cited

U.S. PATENT DOCUMENTS 11,618,841 B2 * 4/2023 Ledwith ................. C09J 175/14
                                                        156/184

* cited by examiner

*Primary Examiner* — David J Walczak
(74) *Attorney, Agent, or Firm* — Steven C. Bauman

(57) ABSTRACT

A sealant material for sealing joints between male and female mating parts comprising:
(a) an elongate flexible thread suitable for wrapping around at least one of the parts, and
(b) a joint sealing composition comprising an anaerobically curable composition in solid form,
the flexible thread being coated with the anaerobically curable composition. This provides a reactive composition on the thread for sealing joints.

5 Claims, 2 Drawing Sheets

- Heat the solid adhesive to 75°C
- Pour the molten adhesive in the container
- Pull the thread to coat it through the small holes

SEALANT MATERIAL

BACKGROUND

Field

The present invention relates to sealant material. Of interest are sealant materials useful for sealing joints. Joints to be sealed include those joining conduits for fluids. For example, the joints may be pipe joints. The invention is useful in the plumbing industry. Of particular interest are materials for sealing threaded pipe joints.

Brief Description of Related Technology

Materials for sealing pipe joints are well-known. For example, International Patent Publication No. WO 98/47805 describes a yarn material which is impregnated with a coating material. LOCTITE® 55 is a product sold based on the technology disclosed therein. While such materials are very useful, and LOCTITE® 55 has been and continues to be quite successful commercially, there are applications and/or environmental conditions where performance improvements could be advantageous.

Non-curing and solvent-based sealing compounds, PTFE tape and hemp & paste have been commonly used to prevent leakage of gases and liquids from pipe joints which are subject to vibration, changing pressures and temperatures. These are pastes made from oils and fillers and although they lubricate and compact into the threads creating a seal, they provide no locking. Furthermore, they can squeeze out under pressure, have poor solvent resistance and do not work on parallel threads.

Solvent-based sealing compounds also lubricate and compact into the threads creating a seal although fittings must be re-torqued to minimise the voids. Their greatest disadvantage is that they shrink during cure, as the solvents evaporate, compromising the efficiency of the seal.

PTFE tape gives a good initial seal and resists chemical attack. Although its ability to act as a lubricant is an advantage is one respect, this action also prompts fittings to loosen under dynamic loads causing loss of clamping force and leakage. It also encourages over-tightening of fasteners, adding stress or fracturing parts. A lot of experience with PTFE tape is needed to ensure consistent results, particularly where a fitting needs to be tightened up to a particular position or torque.

Hemp and paste has been used for many years but it is messy and slow to assemble requiring a degree of experience and technique to achieve a complete seal. Another disadvantage of this sealing method is it cannot be used on fittings carrying potable water German Patent Publication DD 254915 describes a sealant for pipe joints using rubber coatings. EP 1 647 511 describes a wire with a polymer core which is coated with cross-linked silicone rubber. Japanese Patent Publication JP2007016173 describes a rotary joint sealant which is a matrix resin including fibres. U.S. Pat. No. 4,502,364 describes a composite fibre packing material. International Patent Publication WO 01/36537 describes a curable silicone composition. European Patent Publication EP 0 399 682 also describes a curable siloxane sealant. US Patent Publication No. 2001/0044486 describes plastisol compositions. Chinese Patent Publication 1127774 describes a sealing material for communication joints. Chinese Patent Publication 1092459 describes a sealing material. Japanese Patent Publication JPS5228548 describes a caulking material. International Patent Publication WO 2016/113076 describes a sealant material for sealing threaded pipe joints that is a multifilament or spun polyphenylene sulfide yarn and a joint sealing composition comprising a silicone oil or a natural oil with a smoke point of about 230° C. or higher. The polyphenylene sulfide yarn is coated with the joint sealant composition. The material forms an effective seal and is resistant even when used in systems in which it is exposed to temperatures in excess of 280° C. The material may be provided in a dispenser. International Patent Publication WO 2016/11307 describes use of a sealing material which is a multifilament or spun yarn coated with a joint sealing composition to seal a joint in a pipe system in which system a fluid having corrosion inhibitors such as diammonium dimolybdate or benzotriazole; and/or sludge removers; and/or an alcohol such as propane diol, or ethylene glycol; and/or a hydrocarbon such as diesel, including biodiesel, fuel oil, or hydraulic oil; and/or steam at a temperature of at least 180° C. and a pressure of at least 10 bar (1000 kPa); is to be passed through the sealed joint. It is surprising that the sealing materials of the invention can maintain a sealed joint despite exposure to such materials.

European Patent Publication EP 1 122 202 describes a winding device for winding a pipe sealant onto a pipe. U.S. Pat. No. 5,172,841 describes a cord dispensing apparatus. U.S. Pat. No. 4,606,134 describes a striking line dispenser.

Notwithstanding the various products which have been made in the past, there still exists a need for alternatives.

SUMMARY

In one aspect, the present invention provides a sealant material for sealing joints between male and female mating parts comprising:
  (i) an elongate flexible thread suitable for winding about at least one of the parts, and
  (ii) a joint sealing composition comprising a joint sealing material comprising an anaerobically curable composition in solid form, the flexible thread being coated with the anaerobically curable composition.

The mating parts may for example be reciprocally threaded parts where one part (screw) threads into another for engagement between the parts. Once the parts are mated, there will be sufficient exclusion of air (oxygen) to allow an anaerobically curable composition to cure.

The anaerobically curable composition for use in a sealant material of the invention is dry to touch.

The elongate flexible thread acts as a carrier for the joint sealing composition.

The anaerobically curable composition is desirably applied to the thread (which acts as a carrier for the anaerobically curable composition) in melted form.

The present invention provides as an article, a material for sealing and locking threaded pipe joints, comprising an elongate flexible thread such as a multifilament yarn that is ready-coated with an anaerobically curable joint sealing composition. This reactive sealant material provides all the traditional benefits of liquid anaerobic sealants i.e. resistance to heat, corrosion, chemicals, shocks & vibration in a liquid-free, but in an easy to use format.

The present invention is a combination of a curable composition and a flexible thread carrier material and provides a material suitable for sealing and locking threaded joints comprising of an elongate flexible thread such as a multifilament yarn ready-coated with an anaerobically curable joint sealing composition. It provides a new article of manufacture capable of both sealing and locking and demonstrates a new method of delivering an anaerobically curable adhesive or sealant to a joint to be sealed for example a joint on a threaded part.

Anaerobic compositions rely on the absence of air and contact with a metal to make them cure. The absence of air is achieved by the sealant displacing the air gaps between the threads. This type of composition is clean and easy to apply, can be used on the most popular sizes of pipe fittings, protects the mated threaded areas against corrosion and unlike other sealing systems they also lock the fitting and resist vibrational loosening. The present anaerobic compositions are solid.

The present invention allows an end user to use a reactive thread to prepare jointed assemblies.

In a thread sealing or thread locking material according to the invention it is desirable that the curable reactive composition is flexible after it is applied to the elongate flexible thread. It is flexible in its solid form. For example the curable composition is considered flexible if the elongate flexible thread to which it has been applied can be bent through an angle of at least about 60 degrees, for example at least about 70 degrees, such as at least about 80 degrees such as at least about 90 degrees. The curable composition does so with any cracking or displacement relative to the elongate flexible thread.

It will be appreciated that cure of the anaerobically curable composition will provide further sealing against leakage in the joint. Furthermore, it is particularly convenient to use an anaerobically curable composition because the composition will remain in an uncured state until such time as air is excluded. This means that the composition for use in the invention although curable will remain in an uncured form, and thus the sealant material of the invention is suitable for storage over long periods. And of course it can be used as needed, for example intermittently, because only sealant material which is used to seal a joint will be subject to curing.

The word "flexible", as it relates to a thread carrying anaerobically curable composition, describes a flexibility which allows winding and sealing. The word "thread", as it relates to a thread carrying anaerobically curable composition, describes a material that can be wound, and includes single filament and multifilament materials. For example it includes multifilament material including yarns such as those which include two or more filaments for example those where two or more filaments are woven together.

The parts may be any mating parts, but of particular interest in the present invention are threaded pipe joints where a first (e.g., male) part screw threads into a second (e.g., female) part.

The anaerobically curable composition may be a free radically curable composition including compositions that are redox curable. The radical generating component may be selected from peroxides, hydroperoxides, hydroperoxide precursors, persulfates and combinations thereof. Suitable materials comprise cumene hydroperoxide, tert-butyl hydroperoxide, hydrogen peroxide, 2-butanone peroxide, di-tert-butyl peroxide, dicumyl peroxide, lauroyl peroxide, 2,4-pentanedione peroxide, pentamethyl-trioxepane [such as that sold under the trade name Trigonox® 311], benzoyl peroxide and combinations thereof.

Desirably the curable component has at least one functional group selected from acrylates and methacrylates, and combinations thereof.

An anaerobically curable composition for use in the invention desirably comprises:
(i) an anaerobically curable component; and
(ii) a curing component for curing the anaerobically curable component;
wherein the composition has a melting point in the range from about 30° C. to about 100° C.

An anaerobically curable composition for use in the invention desirably comprises:
(i) an anaerobically curable component the anaerobically curable component comprising:
 a) a solid resin component and
 b) a solid anaerobically curable monomer; and
(ii) a curing component for curing the anaerobically curable component;
wherein the composition is solid and has a melting point in the range from 30° C. to 100° C.

The anaerobically curable composition for use in the invention is desirably solid. In this respect solid means non-flowable at ambient temperature and with a melting point above about 30° C. Thus, solid does not mean gel.

The curing component is for curing the curable component.

The formulation of compositions for use in the invention provides the composition in solid tack-free form. The compositions for use in the invention are suitable for application to an elongate flexible carrier thread.

The anaerobically curable component, for example the reactive resin component and/or the reactive monomer component, of a composition for use in the invention act(s) as a carrier for any other components of the composition. Overall though a composition for use in the invention is solid.

One of the main benefits of using such a composition is that it is in effect almost 100% reactive. Components which themselves participate in the anaerobic curing form the carrier (for example a matrix) in which other components may be carried, for example, dispersed.

It will be appreciated that not all components of the composition have to be solid. For example, it is usual that the curing component is in liquid form. Also, a composition for use in the invention may include an anaerobically curable monomer in liquid form.

However, whenever such component(s) are present the composition for use in the invention is formulated so that overall it is a solid.

It is desirable that any component, for example initiator or monomer that may be in liquid form is encapsulated. Encapsulating liquid components is advantageous as achieving an overall composition that is in solid form is facilitated by encapsulation.

Desirably liquid components whether encapsulated or not make up (by weight based on the overall weight of the composition) no more than 10% of the weight of the composition.

Any melting and re-solidification may be measured by DSC (Differential Scanning calorimetry).

Compositions for use in the invention can be applied to the elongate flexible thread in any manner. One advantage is that the compositions for use in the invention and the sealant material of the invention can be made and/or applied to a substrate in a manner that does not require use of a solvent, such as an organic solvent or water. This avoids the necessity for a liquid carrier for the composition. A sealant material of the invention is thus essentially dry to touch with consequent handling advantages. For example, the compositions for use in the invention will flow when melted or when in particulate form and there is no requirement for a liquid carrier, and there is no requirement for drying off of solvent or water to achieve application to an elongate flexible thread to form a sealant material of the invention.

Dry-handling of the sealant material, for example on production lines, is thus both achievable and advantageous. Once applied and for instance (to an elongate flexible thread), compositions for use in the invention will also be dry to touch. Dry to touch products are desirable from a handling point of view to eliminate contamination, fouling, spillages, loss of composition from a substrate etc.

The sealant materials of the invention are suitable for storage or handling for instance during shipping even when applied on a part. This storage or handling does not adversely affect the integrity of the applied composition.

For example, a composition for use in the invention may be applied (by melting) to the elongate flexible thread, as a liquid, for example at 80° C., but cools quickly and is dry to touch quickly, for example in less than 5 minutes.

The viscosity of a melted composition for use in the invention can be controlled by increasing or decreasing the temperature. The composition solidifies rapidly, for example within 2-3 minutes at room temperature without the need for any additional external cooling methods to produce a dry-to-touch, transfer-resistant solid material which may take the form of a coating on the elongate flexible thread.

Furthermore, the compositions for use in the invention have shown long-term stability. For example, stability in excess of six months has been achieved.

A further advantage of the compositions for use in the present invention is that there is no cross contamination when a sealant material of the invention touches another article.

In respect of the present invention tack free means dry to the touch yet the composition will not flake off during handling or use. For example, sealant material of the invention shall be dry to the touch. The sealant material is considered dry to the touch if 20 lengths of such sealant material are individually placed on dry tissue paper for four hours and there is no change in appearance of the tissue.

It is understood by the person skilled in the art that in order to apply compositions for use in the invention sufficient melting may be carried out to allow application of the composition to the elongate flexible thread in a manner in which it adheres. Melting the material for application avoids the necessity for a liquid carrier for the composition. The expression tack free and dry to the touch relate to the composition after it has been (melted and) applied to the elongate flexible thread and then has (re-) solidified. A test to determine that the article is dry to the touch should only be conducted after the composition is no longer in melted form. For example, the testing should be done at least about 30 minutes after the composition is applied.

A composition for use in the invention may have a melting point from about 40° C. to about 100° C. such as about 50° C. to about 100° C. Such temperatures compare favourably with the temperatures utilised to dry liquid based formulations.

Any suitable anaerobically curable component, such as an anaerobically curable monomer, may be used in the composition provided that it allows the composition to be provided in melted form so that the composition has a melting point in the range from about 30° C. to about 100° C.

The anaerobically curable component may comprise an anaerobically curable monomer. The anaerobically curable component may comprise an anaerobically curable resin component. The resin component has functionality to make it curable by redox initiated polymerisation.

The anaerobically curable resin component may have a melting point in the range from about 50 to about 80° C. It may have a re-solidification point (after melting) in the range from about 30 to about 50° C. Having a re-solidification point in this range means that the material will re-solidify when ambient conditions have a temperature of 30° C. or lower. So the composition will re-solidify under typical ambient conditions. It is understood that re-solidification may not occur at a single temperature but instead occur over a temperature range. In any event for the purposes of this invention the end point temperature for re-solidification is desirably at or above 30° C. —that is when exposed to temperatures below the re-solidification point temperature the composition will turn back to its solid form. The anaerobically curable component may comprise an anaerobically curable monomer and a resin component.

In a composition for use in the invention the anaerobically curable component may be a combination of separate/different components. Where the anaerobically curable component is a combination of separate/different components it is desirable that two or more, or indeed all of the components forming the anaerobically curable component have a melting point in the range from about 30° C. to about 100° C. It is desirable that at least two and desirably all components of the inventive composition have a melting point in the range from about 30° C. to about 100° C.

Where the anaerobically curable component is a combination of separate/different components it is desirable that two or more, or indeed all of the components are solid, both when separate and when mixed.

Where the anaerobically curable component is a combination of separate/different components it is desirable that at least two, and desirably all components are anaerobically curable. Where there is more than one component desirably at least two and desirably all are functional insofar as they participate in an anaerobic cure reaction. They are reactive.

It will be appreciated that other components may not participate in an anaerobic cure reaction. They are unreactive. Such components may however become part of the cure product having been incorporated therein during the curing of other components.

Where a composition for use in the invention includes a resin component it is desirable that the resin is anaerobically curable (it participates in an anaerobic cure of the composition).

Where a composition for use in the invention includes a resin component and an anaerobically curable monomer it is desirable that each have a melting point in the range from about 30° C. to about 100° C. In such a case each are solid.

A composition for use in the invention may be provided in an at least two-part form where a first part comprises a resin component and a second part comprises an anaerobically curable monomer.

The anaerobically curable component may be provided in powder form for application to an elongate flexible thread.

Where the composition for use in the invention includes a resin component, the resin component may be provided in a flowable particulate form, for example powder form for application to an elongate flexible thread.

Where the composition for use in the invention includes an anaerobically curable monomer, the anaerobically curable monomer may be provided in a flowable particulate form, for example powder form for application to an elongate flexible thread.

Where the anaerobically curable component is a combination of separate/different components the anaerobically curable component may be the product formed by melting the components and blending them together to form a solid blended product.

For example the anaerobically curable component may include the product formed by melting a resin component and an anaerobically curable monomer and blending them and forming a solid blended product. This blended product can act as a matrix to hold other components (of the curable composition).

A composition for use in the invention may include the product formed by reducing the solid blended product into a flowable particulate form.

It is desirable that in the composition for use in the invention the particulate form has an average particle size of less than about 500 μm, such as from about 20 μm to about 500 μm. For example it is desirable that the composition has passed through a sieve that allows particles with a particle size of less than about 500 μm, such as from about 20 μm to about 500 μm.

In a composition for use in the invention the anaerobically curable component will typically be present in an amount of from about 80% to about 99% by weight of the total composition, for example from about 93 to about 97%.

It will be appreciated that one or more reactive species may be microencapsulated. For example, anaerobically curable monomer may be encapsulated. If the anaerobically curable monomer is liquid, encapsulation helps with preparation of a composition in solid form.

In general where a composition for use in the invention includes an anaerobically curable monomer in liquid form this will be less than 50% (by weight based on the total weight of the composition) of the overall anaerobically curable monomer present. The major part will be anaerobically curable monomer in solid form.

Where any species is encapsulated for example microencapsulated it can be added to the composition at a stage after a particulate from has been prepared. For example, after grinding, for example milling has occurred. This means that the encapsulated material is not released from its encapsulated form before incorporation into a composition for use in the invention.

For example, one encapsulated anaerobically curable monomer is ethoxylated bisphenol A dimethacrylate available under the trade name GRUF Lipocapsules RD and available from Lipo Technologies Inc.

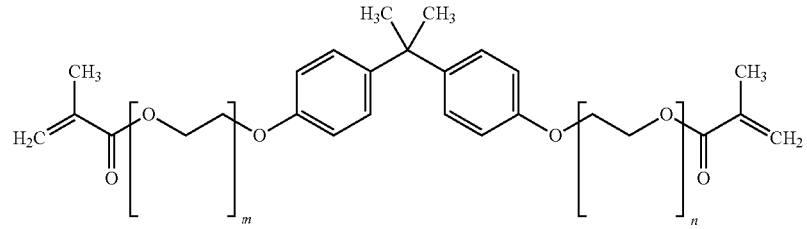

Where a composition for use in the invention includes a resin component the resin component may be a radically polymerizable solid resin.

Where a composition for use in the invention includes a resin component, the resin component may be present in an amount of from about 10 to about 60%, such as from about 25 to about 50%, for example from about 20 to about 30% by weight based on the total weight of the composition.

The resin component may be selected from: (meth) acrylated polyurethane resins with a molecular weight of about 2,000 g/mol or higher; novolac resins with a molecular weight of about 2,000 g/mol or higher, (meth)acrylated polyester resins with a molecular weight of about 2,000 g/mol or higher and combinations thereof. For example, the resin component may have a molecular weight in the range from 2,500 to 40,000 g/mol. The resin component may have a melt viscosity of from about 0.5 to about 20 Pa·s at 80° C. To dispense such compositions they may be melted and then allowed to cool.

Where a composition for use in the invention includes an anaerobically curable monomer, it may be present in an amount of from about 40 to about 90%, such as from about 45 to about 85%, for example 50 to about 80% such as from about 45 to about 70% by weight based on the total weight of the composition.

The anaerobically curable monomer desirably comprises at least one acrylate or methacrylate ester group.

In a composition for use in the invention the anaerobically curable component may include at least one of: (meth) acrylated polyurethane resin with a molecular weight of less than about 1000 g/mol, (meth)acrylate monomers, including encapsulated (meth)acrylate monomers; and combinations thereof.

where m and n are each independently integers and m+n=2.

Encapsulation may be achieved by including a urea-formaldehyde polymer such as CAS 9011-05-6. Encapsulation may be achieved by including a gelatin material such as CAS 9000-7-8. Encapsulation may be achieved by including a resorcinol material (1,3-benzenediol) such as CAS no. 108-46-3. Combinations of same may be utilised for encapsulation. For example, combinations of these materials may be used to encapsulate ethoxylated bisphenol A dimethacrylate.

The curing component is typically present in an amount of from about 0.1 to about 10%, such as from about 1 to about 5%, for example about 5% by weight based on the total weight of the composition.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Stabilizers such as quinone or hydroquinone may be included.

It will be appreciated that a composition for use in the invention does not have a liquid carrier component and thus can be considered to be essentially solvent-free, for example comprising less than about 1% solvent, such as less than about 0.5% solvent such as less than 0.05% such as less 0.01% by weight based on the total weight of composition. So an advantage of the present invention is that there is no liquid carrier required with the result that the composition comprises little or no solvent (for example organic solvent or water).

In a sealant material of the invention the joint sealant composition may be present in an amount from:
  about 5 to about 90% w/w, such as about 10 to about 80% w/w, suitably
  about 20 to about 70% w/w, for example about 30 to about 65% w/w,
  optionally about 40 to about 60% w/w,
and the elongate flexible thread may be present in an amount from about 10 to about 95% w/w, such as about 15 to about 80% w/w, suitably about 20 to about 70% w/w, for example about 30 to about 65% w/w, optionally about 40 to about 60% w/w of elongate flexible thread.

The invention also relates to a method of applying a joint sealing composition comprising an anaerobically curable composition to an elongate flexible thread comprising the steps of:
  (i) melting the anaerobically curable composition; and
  (ii) applying the anaerobically curable composition in melted form to the elongate flexible thread.

The application of the anaerobically curable composition in melted form to the elongate flexible thread may be achieved by drawing the elongate flexible thread through a mass of the anaerobically curable composition in melted form.

The invention also relates to a method of sealing joints between male and female mating parts by:
  (i) providing a sealant material comprising:
    (a) an elongate flexible thread suitable for wrapping around at least one of the parts, and
    (b) a joint sealing composition comprising a an anaerobically curable composition in solid form,
    the flexible thread being coated with the anaerobically curable composition;
  (ii) winding the sealant material about at least one of the parts; and
  (iii) mating the parts so as to seal a joint with the sealant material.

A polyurethane ("PU") resin component for use in the present invention may be formed by reacting a polyol with a diisocyanate in the ratio of OH:NCO of 1 to at most 1.6, for example 1 to at most 1.5 such as about 1:1.4 e.g. 1:1.36. To that reaction product a (meth)acrylate may be added in the ratio of chemical equivalence of OH:NCO of at most 1.6 to 1, for example at most 1.5 to 1 such as 1.4:1 to form a polyurethane (meth)acrylate resin wherein the amount of OH includes that of the previously added polyol.

For example, the present invention provides an article of manufacture comprising an elongate flexible thread to which an anaerobically curable composition comprising at least one reactive component is applied, the composition being in solid form and having a structural integrity imparted by said at least one reactive component of the composition, the structural integrity being sufficient to allow the flexible thread to be handled without separation of the composition from the elongate flexible thread.

Furthermore, the article of manufacture may be provided in curable solid tack-free form. This means that there will be no soiling of any equipment or packaging etc. comes into contact with the article.

An article of manufacture may be provided in the form of a dispenser from which the coated elongate flexible thread may be dispensed and includes the coated elongate flexible thread and a dispenser for it.

An article of manufacture according to the invention can be formed from a composition for use in the invention. This may be done, for example, by melting of the composition for use in the invention, coating the elongate flexible thread with the composition by drawing the thread through the melted composition and allowing the composition to re-solidify (on the thread).

It will be appreciated, that the melted form is sufficient for application. No liquid carrier is required.

Where a composition for use in the invention is provided in an at least two-part form those two parts may be separately applied.

The composition for use in the invention may include (as a resin) a (long chain) meth(acrylated) polyurethane for example:

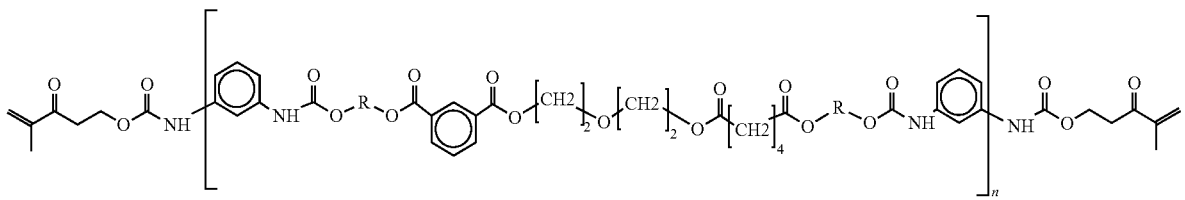

where n is an integer from 2 to 10 for example a compound of the above formula having a molecular weight of about 6,000 g/mol may have a melting point of 75 to 85° C.

The composition for use in the invention may include (as a resin) a novolac vinyl ester for example

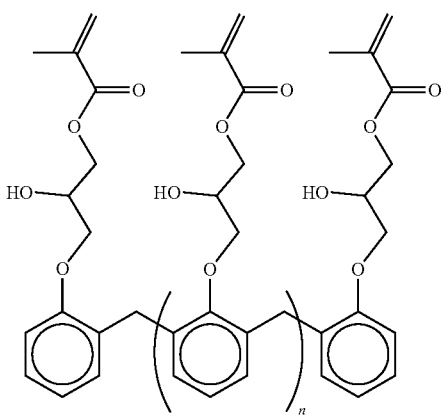

where n is an integer from 2-10. For example a compound of the above formula having a molecular weight of about 6,000 g/mol may have a melting point of 75 to 85° C.

The composition for use in the invention may include (as an anaerobically curable monomer):

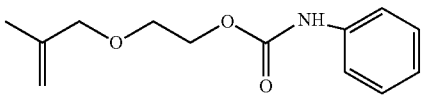 [SMILES: C=C(C)COCCOC(=O)Nc1ccccc1]

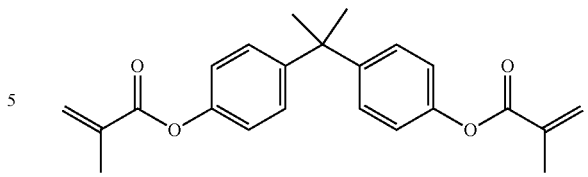

which is 2-methacryloxyethylphenylurethane with a melting point of about 70-75° C.

It will be appreciated however that compositions for use in the invention may be dry to the touch after a short time, for example after about 30 minutes.

The composition for use in the invention may be formulated as a one-part or two (or more) part composition. It is desirable that the composition or each part of the composition is solid and optionally is in a flowable form. For example it may be desirable that the composition or each part of the composition is in flowable particulate form, for example powder form.

Provided of course that the anaerobically curable component has a melting point in the range from about 30° C. to about 100° C. it can be selected from any suitable anaerobically curable materials (or any combination of the materials) including those set out below.

Anaerobic curable compositions may have an anaerobically curable component based on a suitable (meth)acrylate component.

One or more suitable (meth)acrylate components may be selected from among those that are a (meth)acrylate monomer having the formula: $H_2C=CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

One or more suitable (meth)acrylate monomers may be chosen from among polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

For example the anaerobically curable component may include as an anaerobically curable monomer bisphenol A dimethacrylate:

which has a melting point of approximately 72 to 74° C.

Still other (meth)acrylate monomers that may be suitable for use herein are silicone (meth)acrylate moieties ("SiMA"), such as those taught by and claimed in U.S. Pat. No. 5,605,999 (Chu), the disclosure of which is hereby expressly incorporated herein by reference.

Other suitable monomers may be chosen from polyacrylate esters represented by the formula

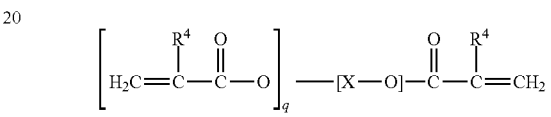

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

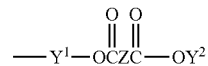

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other monomers may be chosen from the reaction products of di- or tri-alkylolamines (e.g., ethanolamines or propanolamines) with acrylic acids, such as are disclosed in French Pat. No. 1,581,361.

Suitable oligomers with (meth)acrylate functionality may also be used. Examples of such (meth)acrylate-functionalized oligomers include those having the following general formula:

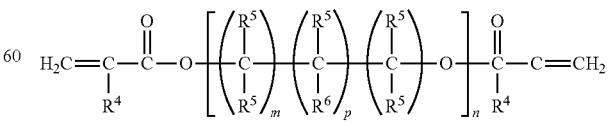

where $R^5$ represents a radical selected from hydrogen, alkyl of from 1 to about 4 carbon atoms, hydroxy alkyl of from 1 to about 4 carbon atoms, or

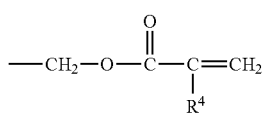

where $R^4$ is a radical selected from hydrogen, halogen, or alkyl of from 1 to about 4 carbon atoms; $R^6$ is a radical selected from hydrogen, hydroxyl, or

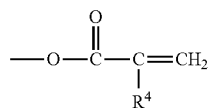

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used.

Suitable compounds can be chosen from among are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use may be chosen from among those of the formula

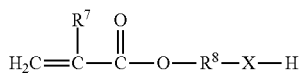

where X is selected from —O— and

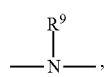

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups upon proper reaction with a polyisocyanate, yield a monomer of the following general formula:

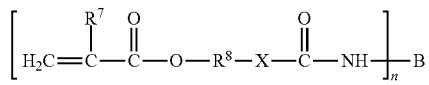

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 g/mol up to about 5,000 g/mol) or in the polymer class (such as about greater than 5,000 g/mol).

Of course, combinations of these (meth)acrylate monomers may also be used.

Desirably the anaerobically curable component comprises at least one acrylate or methacrylate ester group.

Desirably the anaerobically curable component comprises is chosen from at least one of epoxy (meth)acrylates, urethane (meth)acrylates, urethane di(meth)acrylates, alkyl (meth)acrylates, stearyl (meth)acrylates, isocyanurate (meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-d i(meth)acrylates, and ethoxylated bisphenol-F-d i(meth)acrylates.

For example the anaerobically curable component may include (as an anaerobically curable monomer) diisocyanates capped with hydroxyethyl methacrylate such as:

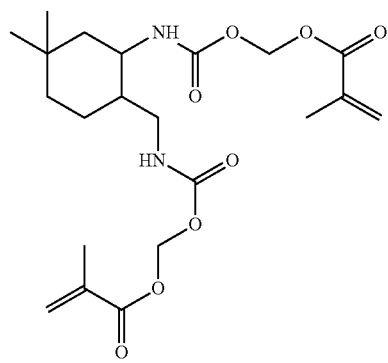 [SMILES: C=C(C)C(=O)OCOC(=O)NCC1CCC(C)(C)CC1NC(=O)OCOC(=O)C(=C)C]

which is HEMA-IPDI-HEMA with a melting point of about 72-74° C.: or

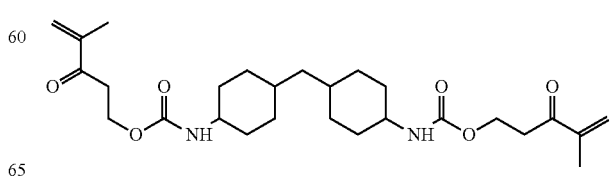

which is HEMA-hMDI-HEMA with a melting point of about 75-85° C.: or

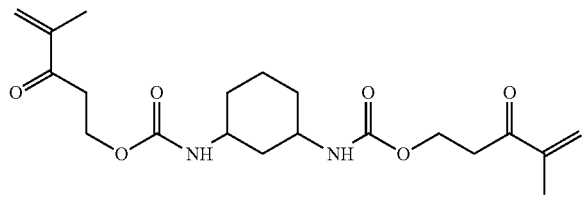 [SMILES: C=C(C)C(=O)CCOC(=O)NC1CCCC(NC(=O)OCCC(=O)C(=C)C)C1]

which is HEMA-6HXDI-HEMA ("RRT600") with a melting point of about 75-85° C.: or

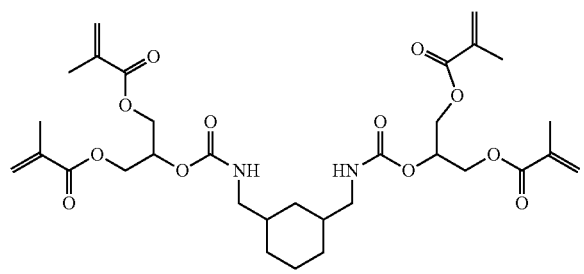 [SMILES: C=C(C)C(=O)OCC(COC(=O)C(=C)C)OC(=O)NCC1CCCC(CNC(=O)OC(COC(=O)C(=C)C)COC(=O)C(=C)C)C1]

which is Glycerol Dimethacrylate-6HXDI-Glycerol Dimethacrylate ("4RRT600") with a melting point in the range from about 75 to about 85° C.

The compositions may also include other conventional components, such as free radical initiators, free radical accelerators, inhibitors of free radical generation, as well as metal catalysts, such as iron and copper.

A number of well-known initiators of free radical polymerization may be incorporated into the compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy) valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

If desired the initiator component may be encapsulated. For example the initiator component may be an encapsulated peroxide, for example encapsulated benzoyl peroxide.

Compositions for use in the present invention may further comprise thickeners and/or fillers.

As mentioned above it will be appreciated that the composition for use in the invention can include non-reactive species including resins. Such components do not participate in an anaerobic cure reaction. They are unreactive. Such components may however become part of the cure product having been incorporated therein during the curing of other components. Examples of such non-reactive species include: fumed silica, polyethylene, polytetrafluoroethylene (PTFE), mica, polyamide wax, titanium dioxide, barium sulphate.

The present invention also provides methods of preparing and using the sealant materials, as well as the reaction products.

The compositions for use in the present invention may be prepared using conventional methods which are well known to those persons of skill in the art. For instance, the components of the composition may be mixed together in any convenient order consistent with the roles and functions the components are to perform in the compositions. Conventional mixing techniques using known apparatus may be employed.

The (meth)acrylate component may comprise from about 25 to about 95 percent by weight of the composition or may comprise from about 40 to about 90 percent by weight of the composition, such as from about 45 to about 85 percent for example such as about 45 to about 70 percent by weight, based on the total weight of the composition.

The thread may be of any suitable natural or synthetic materials, including fibrous materials. The thread may be a synthetic polymer such as a polyamide (e.g. a nylon), a polypropylene, a polyester, PTFE, or polyphenylene sulphide. The thread also may be made from a natural material such as cotton.

Other potential components of a composition for use in the invention include one or more selected from inert fillers such as calcium carbonate, talc, rheology modifiers where required (for example organoclays), and polymeric fillers such as polytetrafluoroethylene (PTFE) or polymethylmethacrylate (PMMA) optionally where PMMA is used it is desirably in the form of microbeads.

BRIEF DESCRIPTION OF THE DRAWINGS

Embodiments of the invention will be described, by way of example only, with reference to the accompanying drawings in which.

DETAILED DESCRIPTION

Figure 1:
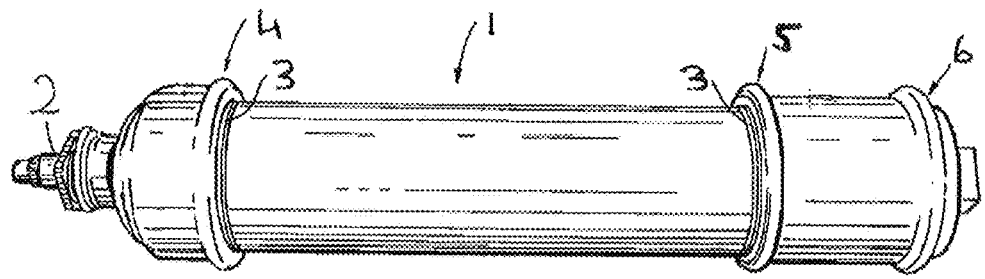
FIG. 1 is a drawing of a test assembly used in the Experimental section below.

An example of an composition that may be considered a basis for formulating (100%) solid anaerobic formulations are given below in Table 1:

TABLE 1

| Solid Anaerobic formulation | |
|---|---|
| Component | Wt % |
| Resin | 25-50 |
| Monomer | 45-70 |
| Cure System | 4-6 |
| Total | 100 |

A key prerequisite of the resins and monomers used is that they are in general solids at RT (room temperature) and have a melting point of <100° C.

General examples of types of materials that could be used are given below in Table 2.

TABLE 2

Examples of types of resins, monomer and initiators that can be used to prepare (100%) solid anaerobic formulation.

| Resins | Monomers | Initiators |
|---|---|---|
| Long chain (Meth) acrylated Polyurethane resins (MW > 2,000 g/mol) | Short chain (Meth)acrylated PU resin with mp 50-80° C. | Peroxides |
| Novolac Vinyl esters | (Meth)acrylate monomers with mp 50-80° C. Encapsulated (meth)acrylate monomers | Encapsulated peroxides |

Preparation

The raw materials are formulated together at a temperature just above the melting point of the individual components. When the formulation has a homogeneous appearance, it is allowed to cool to room temperature. At this point, it is a solid.

Example 1

Example of Resin Synthesis

Charged Dynacoll 7380 (90.89 g), Butylated hydroxytoluene (0.03 g), 4-methoxyphenol (0.03 g) and phosphoric acid (0.007 g) to the reaction vessel and mixed while heating to 120° C. Allowed temperature to decrease and mixed for 20 minutes at 100° C. Added DBTDL (0.037 g) with mixing and then slowly added the toluene diisocyanate (6.28 g) into the vessel, maintaining the temperature at 100° C. throughout the reaction. Continued mixing for 2-3 hours or until wt % Isocyanate (NCO) reached equilibrium. Titrated for remaining NCO. Added 90% of the required HEMA (~2.5 g) based on titre. Added dibutyltin dilaurate (0.037 g). Allowed to react for 3 hours and monitored the NCO consumption via titration. Where the % NCO remaining is >0.2% charged the calculated 2nd addition of HEMA. Stopped the reaction when NCO content is <0.2%.

Figure 2:
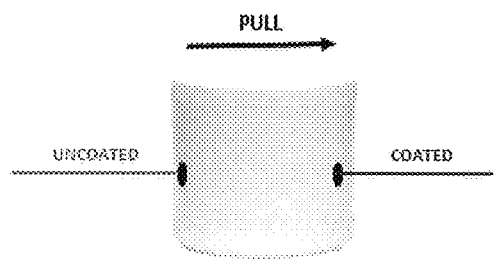
FIG. 2 is a schematic representation of a vessel and method of applying a composition to an elongate flexible thread.

Once a suitable resin has been prepared, the raw materials are formulated together at a temperature just above the melting point of the individual components. When the formulation has a homogeneous appearance it is poured into a vessel as shown in FIG. 2. The yarn is then pulled through the molten adhesive formulation which is coated/absorbed onto the cord. Excess adhesive formulation is removed by the act of passing the yarn through another small aperture in the container. The coated yarn is then allowed to cool to room temperature producing an anaerobic coated/impregnated yarn.

An appropriate yarn can be a single strand or multifilament yarn comprised of polyamide or polypropylene.

Example 2: Formulation

The following composition was prepared as in Example 1

| Material | % |
|---|---|
| Di-functional methacrylated polyurethane resin from partially crystalline polyol | 25.0 |
| 2-Methacryloxyethylphenylurethane | 35.0 |
| RRT600 | 35.0 |
| Saccharin | 0.2 |
| Acetyl Phenyl Hydrazine | 0.2 |
| Maleic Acid | 0.2 |
| PEG 200 dimethacrylate | 1.4 |
| BPO microcaps | 4.0 |
| | 100 |
| Melt temperature | 70° C. |

Figure 3:
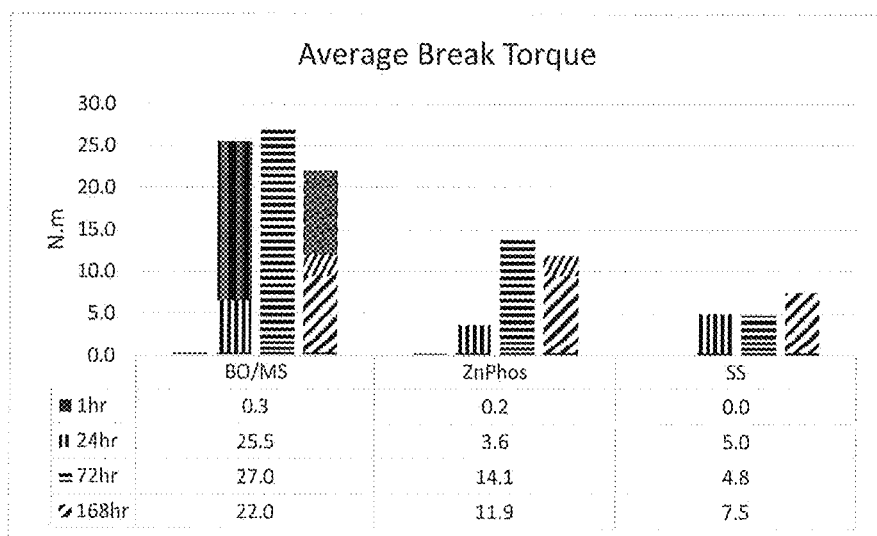
FIG. 3 shows average break torque results for Example 2.

Thread-Locking:

The above formulation was coated onto a Nylon 6,6 yarn of 950 dtex as shown in FIG. 2 and described above to yield approximately 1 g anaerobic formulation per 1 g thread. Thread-locking capabilities were examined using standard nut and bolt assemblies. The cord was applied to the male threads in accordance with DIN 267-27 and once applied did not exceed the thread height. Break torques were determined in accordance with ISO10964. The results of these tests are set out in FIG. 3.

Thread-Sealing:

Pipes and fittings with cut threads in accordance with ISO 7-1 were used. The test specimens used have the following characteristics:

Tapered thread nipple, made of steel, length 250 mm
Reducer brushing, made of malleable iron, zinc coated, parallel threads
Bushing, made of malleable iron, zinc coated, parallel threads
Stopper, made of malleable iron, zinc coated, tapered threads The reactive cord was applied to the male threads of the components such that there was a coating of one cord per thread. The thread-sealing capabilities were then tested according to EN 751-1 (for curing compounds). The following tests were carried out sequentially.

The test assembly 1 used is shown in FIG. 1 below and includes a pressure connection 2.

The reactive cord was applied to the male threads 3 of the test joints 4, 5 and 6 so that there is one chord per thread. The test pieces were assembled as shown in FIG. 1 using a torque wrench to apply an input torque of 150 Nm. The samples were room temperature tested.

The parts and in particular the joints were then tested according to Standard EN751-1 Screening Test sequentially as follows.

Test 1: Internal Pressure Test after Assembly

The specimens were tested between 30-60 minutes after the assembly. The pipes were immersed in a water bath at about 23° C. 7.5 bar 7.5±3 bar (0.75 MPa±0.3 MPa) of compressed air was used to pressurize the test piece. Gas leakage was determined by the appearance of bubbles during an immersion period of 5 minutes, ignoring those noted during the first 15 seconds of immersion.

Test 2: Hot Water Resistance Test

The test assemblies were half filled with tap water and the reducing bushing was closed by a R½" plug sealed with Teflon tape. The assemblies were placed in an oven at 130°

C. in a horizontal position for 168 hours. After this period of time, the assemblies were cooled to room temperature for 2 hours, the plug was removed and the water drained. The internal pressure test for leaks was repeated with compressed air.

Test 3: Temperature Cycling Test

The test assemblies were placed into a temperature chamber at 150° C. for 22 hours and then cooled down to 20° C. for 2 hours. The temperature cycling test was repeated 5 times. The specimens were then cooled down to −20° C. for 4 hours and warmed to 20° C. for 2 hours. The internal pressure test for leaks was repeated with compressed air. The results are as follows:

| Test No. | Joint 1 (reference numeral 4 in FIG. 1) | Joint 2 (reference numeral 5 in FIG. 1) | Joint 3 (reference numeral 6 in FIG. 1) |
| --- | --- | --- | --- |
| 1 | No leaks | No leaks | No leaks |
| 2 | No leaks | No leaks | No leaks |
| 3 | No leaks | No leaks | No leaks |

Example 3

The following composition was prepared as in Example 1:

| Material | wt % |
| --- | --- |
| Di-functional methacrylated polyurethane resin from partially crystalline polyol | 50.0 |
| 2-Methacryloxyethylphenylurethane | 34.0 |
| RRT600 | 10.0 |
| Saccharin | 0.2 |
| Acetyl Phenyl Hydrazine | 0.2 |
| Maleic Acid | 0.2 |
| PEG 200 dimethacrylate | 1.4 |
| Cumene hydroperoxide | 4.0 |
| | 100 |
| Melt temperature | 70° C. |

Figure 4:
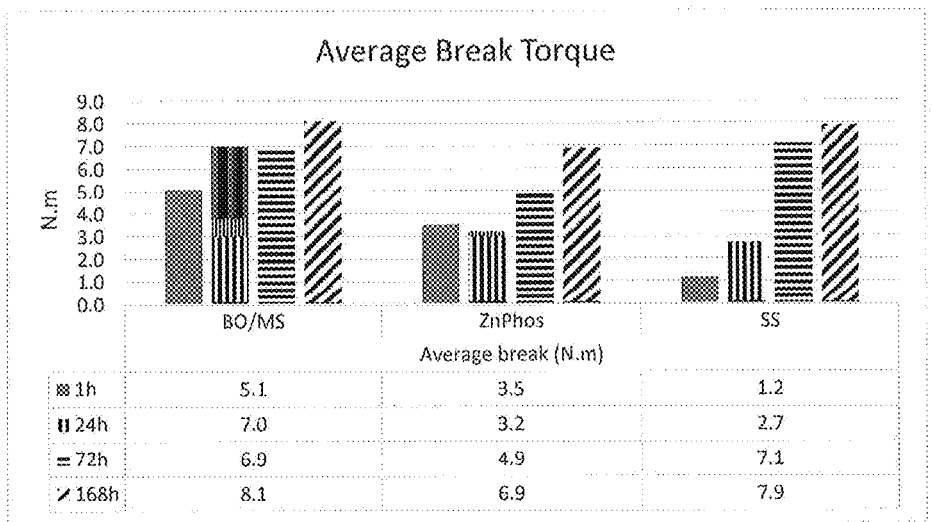
FIG. 4 shows average break torque results for Example 3.

Thread-Locking:

The above formulation was coated onto a Nylon 6,6 yarn of 950 dtex as shown in FIG. 2 and described above to yield approximately 1 g anaerobic formulation per 1 g thread. Thread-locking capabilities were examined using standard nut and bolt assemblies. The cord was applied to the male threads in accordance with DIN 267-27 and once applied did not exceed the thread height. Break torques were determined in accordance with ISO10964. The results of these tests are set out in FIG. 4.

Thread-Sealing Performance:

The procedure described above for Example 2 was repeated with the formulation of the present example and gave the following results:

| Test No. | Joint 1 (reference numeral 4 in FIG. 1) | Joint 2 (reference numeral 5 in FIG. 1) | Joint 3 (reference numeral 6 in FIG. 1) |
| --- | --- | --- | --- |
| 1 | No leaks | No leaks | No leaks |
| 2 | No leaks | No leaks | No leaks |
| 3 | No leaks | No leaks | No leaks |

Example 4: Flexible PUMA Resin Based Formulation Vs Crystalline PUMA Resin Based Formulation

| Material | Flexible Resin from partially crystalline polyol (wt. %) | Crystalline Resin from highly crystalline polyol (wt. %) |
| --- | --- | --- |
| Di-functional methacrylated PU resin | 50.0 | 50.0 |
| 2-Methacryloxyethylphenylurethane | 34.0 | 34.0 |
| RRT600 | 10.0 | 10.0 |
| Anaerobic liquid cure system | 2.0 | 2.0 |
| Cumene hydroperoxide | 4.0 | 4.0 |
| | 100 | 100 |
| Melt temperature | 70° C. | 70° C. |

Figure 5:
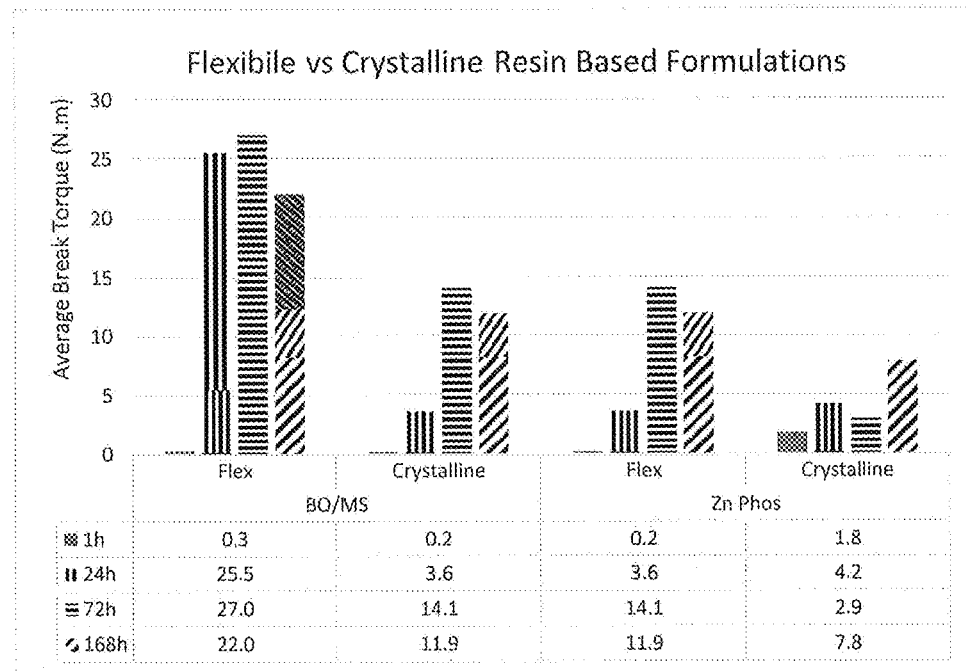
FIG. 5 shows comparative average break torque results for Example 4.

Thread-Locking:

The above formulations were coated onto a Nylon 6,6 yarn of 950 dtex as shown in FIG. 2 and described above to yield approximately 1 g anaerobic formulation per 1 g thread. Thread-locking capabilities were examined using standard nut and bolt assemblies. The cord was applied to the male threads in accordance with DIN 267-27 and once applied did not exceed the thread height. Break torques were determined in accordance with ISO10964. The results of these tests are set out in FIG. 5.

It is clear from the foregoing experimental work that the sealant materials of the present invention clearly provide advantages compared to other compositions and have been carefully formulated for optimum properties.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. An article of manufacture comprising an anaerobically curable joint sealing composition in solid form packaged in a dispenser from which the anaerobically curable joint sealing composition in solid form can be supplied for direct application to a joint to be sealed.

2. A method of applying an anaerobically curable joint sealing composition in solid form to an elongate flexible thread comprising the steps of:
   (a) melting the anaerobically curable joint sealing composition in solid form; and
   (b) applying the anaerobically curable joint sealing composition in melted form to the elongate flexible thread.

3. A method according to claim 2 wherein the application of the curable composition in melted form to the elongate flexible thread is achieved by drawing the elongate flexible thread through a mass of the curable composition in melted form.

4. A method according to claim 2 wherein the method forms a sealant material.

5. A method of sealing joints between male and female mating parts by:
   (a) providing an anaerobically curable joint sealing composition in solid form comprising:
      (i) an elongate flexible thread suitable for wrapping around at least one of the parts, and
      (ii) a joint sealing composition comprising an anaerobically curable composition in solid form, the flexible thread being coated with the anaerobically curable composition;
   (b) winding the sealant material about at least one of the parts; and
   (c) mating the parts so as to seal a joint with the sealant material.

* * * * *